United States Patent
Johnston

(10) Patent No.: US 7,197,805 B2
(45) Date of Patent: Apr. 3, 2007

(54) EMBEDMENT REMOVAL METHOD

(76) Inventor: Edward P. Johnston, Box 4, Group 525, RR 5, Winnipeg, Manitoba (CA) R2C 2Z2

( * ) Notice: Subject to any disclaimer, the term of this patent is extended or adjusted under 35 U.S.C. 154(b) by 5 days.

(21) Appl. No.: 10/997,854

(22) Filed: Nov. 29, 2004

(65) Prior Publication Data

US 2006/0112529 A1    Jun. 1, 2006

(51) Int. Cl.
*B23P 19/02*   (2006.01)
*B23P 6/00*    (2006.01)

(52) U.S. Cl. .................. 29/426.4; 29/426.1; 29/402.01

(58) Field of Classification Search ............... 29/426.4, 29/426.1, 402.01, 402.02, 402.03, 402.06; 299/15; 125/31; 451/296, 295
See application file for complete search history.

(56) References Cited

U.S. PATENT DOCUMENTS 2,050,761 A * 8/1936 Newsom ...................... 299/15
3,793,698 A * 2/1974 Goings ..................... 29/402.18
4,735,188 A * 4/1988 Kubo .......................... 125/21
4,832,411 A   5/1989 Johnston et al.
5,148,635 A * 9/1992 Porter ........................ 451/296

* cited by examiner

*Primary Examiner*—John C. Hong

(57) ABSTRACT

Draft tube embedments of a hydroelectric turbine are removed for replacement and/or upgrading. Several shafts for saw wire access, forming a horizontal polygonal shape are drilled outside the draft ring and a circular slot cut below the bottom ring to meet the shafts. Shafts and slot encompass the embedments. Additional shafts are drilled for hoist slings. Generally radial cuts are made using diamond saw wires attached to saw wire machines from selected saw wire access shafts to the draft tube through the embedments. Back cuts are made between adjacent saw wire access shafts, again by diamond saw wires attached to saw wire machines, cutting the polygon into sections. Hoisting slings are passed down the hoisting sling shafts around the sections. The sections are then cut free by further back cuts and then hoisted from the draft tube. The method is quicker than conventional methods.

20 Claims, 2 Drawing Sheets

EMBEDMENT REMOVAL METHOD

FIELD OF INVENTION

The invention is a method of draft tube liner embedment removal in hydroelectric generating stations.

The invention is directed to a method of embedment removal, which comprises drilling vertical shafts around and outside the discharge ring to form a polygon to encompass the embedments, and cutting a continuous horizontal circumferential slot below the bottom ring. Vertical radial cuts extending down to the slot are made by diamond wire saw from selected shafts through the embedments to the discharge tube. Vertical back cuts are made between radial cuts down to the slot from adjacent shaft to adjacent shaft by diamond wire saw to cut sections of embedment free, which are then hoisted from the discharge tube.

Although the invention is described and referred to specifically as it relates to specific methods and steps for removing draft tube liner embedment(s) it will be understood that the principles of this invention are equally applicable to similar methods and steps for removing embedments and accordingly, it will be understood that the invention is not limited to such specific methods and steps for removing such embedments from draft tubes.

PRIOR ART

The only related prior art of which applicant is aware is U.S. Pat. No. 4,832,411 issued 23 May 1989 to Johnston et al. (applicant) for cutting reinforced concrete, which is hereby incorporated by reference.

BACKGROUND

Hydroelectric generating stations have water driven turbines of the fixed blade propeller type, which are mounted in draft tubes through which water flows driving the turbines. The portion of a vertical draft tube in which the turbine turns includes the discharge ring, the draft tube liner, and the bottom ring all of steel plate embedded in surrounding concrete by anchor bolts and reinforcing structure members, together referred to as embedment(s). To repair or replace the draft tube adjacent the turbine the embedments must be removed and the draft tube liner and associated embedments replaced.

DESCRIPTION OF THE INVENTION

It is a principal object of the invention to remove draft liner tube embedments from the surrounding supporting structure by cutting through the embedments and supporting structure to form removable portions of the embedment. It is a subsidiary object of the invention to drill a vertical shaft near and outside the draft tube. It is a subsidiary object of the invention to cut a continuous horizontal circular slot below the draft tube embedments. It is a subsidiary object of the invention that the horizontal slot and vertical shaft intercept. It is a further subsidiary object to cut a vertical radial cut from the vertical shaft through the embedment to the draft tube. It is a further subsidiary object to drill a second vertical shaft near the draft tube and near the first vertical shaft to the circular slot. It is a further subsidiary object to cut a vertical back cut between the first and second vertical shafts. It is a further subsidiary object of the invention to drill several vertical shafts around the draft tube forming a horizontal polygon outside the draft tube embedments, the shafts extending to the circular slot. It is a further subsidiary object of the invention to cut selected vertical radial cuts from selected vertical shafts through the embedments to the draft tube to divide the polygon into sections. It is a further subsidiary object of the invention to cut vertical back cuts from each vertical shaft to the next to cut the sections of the polygon free from its surroundings, It is a further subsidiary object of the invention to remove the sections of the polygon. Other objects and advantages of the present invention will become obvious to those skilled in the art, from the following specification, accompanying drawings and appended claims, and it is intended that these objects and advantages are within the scope of the present invention.

As used in the description of the invention and the appended claims the term "saw wire" defines the wire element used to cut through concrete, steel, rock and the like, while the term "wire saw" refers to the machine used to drive the wire element while cutting through concrete, steel, rock and the like.

In one broad aspect of the invention it is directed to a method of removing draft tube liner embedments from a draft tube, comprising the step of drilling a vertical shaft near the draft tube, for saw wire access. This shaft is outside the draft ring of the draft tube and extends below the embedments. The method also comprises the step of cutting a continuous horizontal circular slot in the wall of the draft tube below the bottom ring of the draft tube and below the embedments also for saw wire access. The circular slot and vertical shaft intercept each other. The slot and shaft are preferably cut and drilled at the same time, for speed, care being taken that cutting and drilling elements do not collide. Preferably the method additionally comprising the step of cutting a vertical radial cut from the vertical saw wire access shaft through the embedments to the draft tube using a saw wire. Preferably this comprises the step of placing a saw wire down the vertical saw wire access shaft out through the circular slot up the face of the draft tube, connecting the saw wire to a wire saw and cutting the vertical radial cut. Usually a pulley system is used to carry the saw wire to the wire saw machine. More preferably the method additionally comprises the step of drilling a second vertical shaft for saw wire access near the draft tube and near the first vertical saw wire access shaft. Like the first shaft, the second vertical shaft is outside the draft ring of the draft tube and extends below the embedments to the circular slot. Preferably the method additionally comprises the step of cutting a vertical back cut between the first and second vertical saw wire access shafts using a wire saw. Generally this preferably comprises the step of placing a saw wire down one vertical saw wire access shaft across the circular slot, fishing the saw wire up the other saw wire access shaft, connecting the saw wire to a wire saw and cutting the vertical back cut.

Most preferably the method comprises the step of drilling several vertical shafts around the draft tube for saw wire access. These shafts form a horizontal polygon outside the draft ring of the draft tube to encompass the embedments, and extend below the embedments to the circular slot. The method also comprises the step of cutting selected vertical radial cuts from selected vertical saw wire access shafts through the embedments to the draft tube to divide the polygon into sections. The method also comprises the step of cutting vertical back cuts from each vertical saw wire access shaft to the next vertical saw wire access shaft from each selected radial cut to the next selected radial cut, to cut the sections of the polygon free from its surroundings. Lastly the method comprises the step of removing the sections. The radial cuts are made by the step of placing a saw wire down each selected vertical saw wire access shaft out through the circular slot up the face of the draft tube, connecting the saw wire to a wire saw and cutting each vertical radial cut. The vertical back cuts are made by the step of placing a saw wire down each vertical saw wire access shaft across the circular slot and fishing the saw wire up the next saw wire access shaft, connecting the saw wire to a wire saw and cutting the vertical back cut.

The distance between adjacent vertical saw wire access shafts is determined to some extent by the desire to cut the minimum distance both between each shaft and around the draft tube, it is also determined by the necessary clearance from the draft tube to ensure full removal of all embedment elements. The shafts by definition usually form a horizontal polygon, outside the draft ring, generally regular, that is each face has the same approximate length, which is not absolutely necessary, and need not be slavishly followed. Commonly polygons are regarded as having five or more faces, strictly triangles and quadrilaterals (including squares and rectangles) are polygons. The number of shafts, and thus the polygon will be determined by experience, circumstance, and convenience.

In a second broad aspect the invention is directed to a method of removing draft tube liner embedments from a draft tube comprising the step of drilling vertical shafts around the draft tube for saw wire access. These shafts form a generally regular horizontal polygon outside the draft ring of the draft tube to encompass the embedments. The method also comprises the step of cutting a continuous horizontal circular slot in the wall of the draft tube below the bottom ring of the draft tube and below the embedments for saw wire access. The circular slot and vertical shafts intercept each other. The method also comprises the step of drilling further vertical shafts around the draft tube for hoisting sling access. These hoisting sling access shafts are located on faces of the polygon aligned with the saw wire access shafts, and extend below the embedments to the circular slot. Preferably the method additionally comprises the step of cutting vertical radial cuts from two adjacent vertical saw wire access shafts to the draft tube wall, using a saw wire, to form a partially cut truncated triangular (V shaped) piece of the polygon the piece having a single polygonal face with two hoist access shafts therein. Next the method preferably comprises the step of welding steel brackets to the draft tube wall across the vertical radial cuts to fix the truncated triangular piece in place. The method preferably comprises the step of cutting a vertical back cut between the two adjacent saw wire access shafts. Preferably the method additionally comprises the step of passing hoist slings down the hoist access shafts, out the circular slot, up the draft tube and securing the slings to hoist means. Preferably the method comprises the step of cutting through the steel brackets and then the step of hoisting the truncated triangular (V shaped) piece from the draft tube. Typically each vertical radial cut is made by placing a saw wire down each saw wire access shaft out through the circular slot, up the draft tube wall, connecting the saw wire to a wire saw and cutting the vertical radial cut. Equally typically the vertical back cut is made by placing a saw wire down one of the adjacent saw wire access shaft across the circular slot and fishing the saw wire up the other adjacent saw wire access shaft, connecting the saw wire to a wire saw and cutting the vertical back cut. The method may comprise the step of cutting vertical radial cuts from two vertical saw wire access shafts to the draft tube wall. These vertical radial cuts are separated by three contiguous faces of the polygon, to form a partially cut piece of the polygon. This piece has three polygonal faces, with two outer faces adjacent the vertical radial cuts, each outer face having a hoist access shaft therein, and a middle face between the outer faces. Typically the next step involves cutting two vertical back cuts along the outer faces between two adjacent saw wire access shafts. Then preferably hoist slings are passed down each hoist access shafts in each outer face back cut, out the circular slot, up the draft tube and the slings are secured to hoist means. Preferably next a vertical back cut is cut along the middle face and the piece is then hoisted from the draft tube. Typically each vertical radial cut is made by placing a saw wire down each saw wire access shaft out through the circular slot, up the draft tube wall, connecting the saw wire to a wire saw and cutting the vertical radial cut. Equally typically each vertical back cut is made by placing a saw wire down one of the adjacent saw wire access shaft across the circular slot and fishing the saw wire up the other adjacent saw wire access shaft, connecting the saw wire to a wire saw and cutting the vertical back cut. The circular slot is made by cutting three parallel cuts and then chipping out the slot with small chipping hammers. The slot is then shored.

DESCRIPTION OF THE PREFERRED EMBODIMENTS

Figure 1:
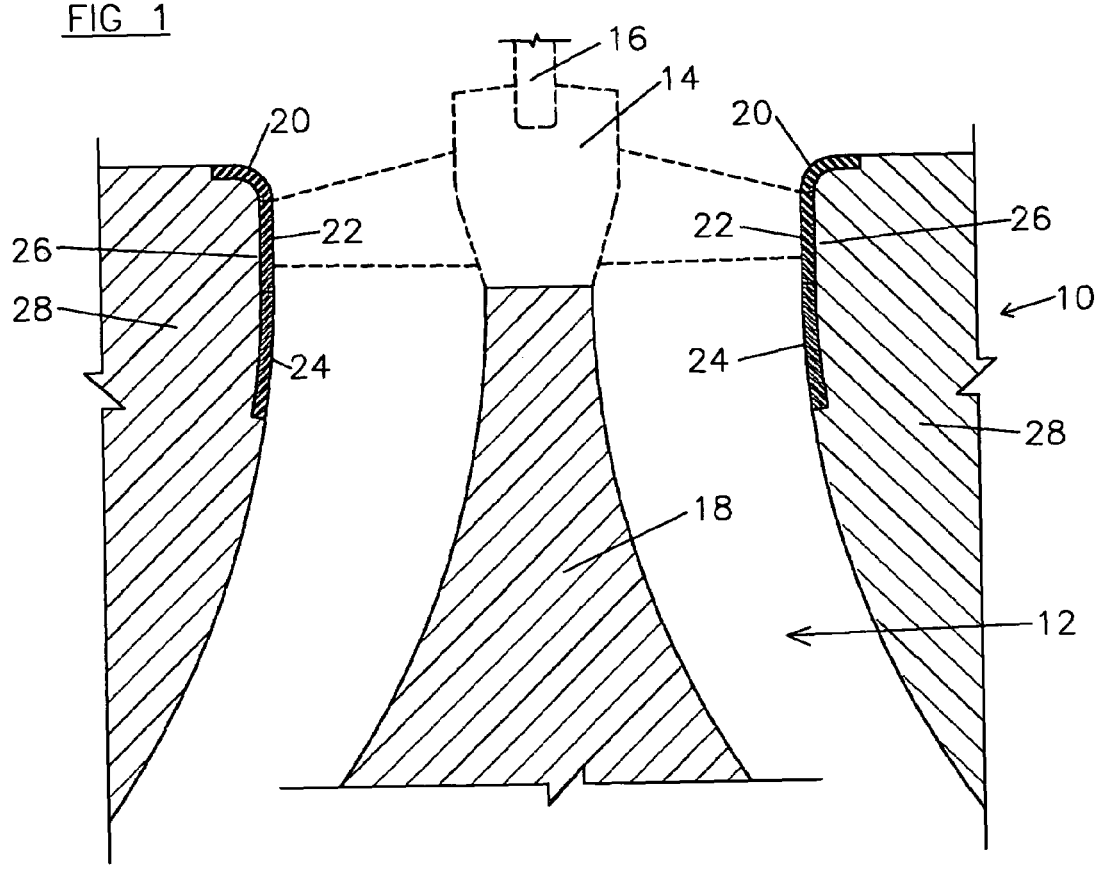
FIG. 1 shows an elevational sectional view of the top of a draft tube.

Numeral 10 indicates a vertical draft tube structure including draft tube 12, turbine 14 attached to shaft 16 shown in ghost, which when present rests on moody cone 18 central to draft tube 12. The top of draft tube 12 has discharge ring 20, draft tube liner 22 and bottom ring 24, typically of 1¾ inch steel plate which together with anchor bolts and reinforcing structure members (not shown) form embedment 26 in circular draft tube wall 28. To remove the embedment the moody cone had first to be partly removed, which it was in four stages. All cuts were made by drilling 3" horizontal holes through the moody cone and horizontal cuts were made using diamond wire fed through the horizontal holes and Dymosha 600 wire saws. When necessary vertical cuts were made upward from the same horizontal holes to reduce the weight of cut sections lifted. The first was cut off 8 feet below the top of the moody cone. The second was cut approximately 8 feet below the level of the bottom of the embedment this section weighed some 45 tons. The third was cut horizontally 6 feet below the first cut, and then cut vertically into two sections for ease of removal. The fourth was cut 10 feet above the bottom of the cone, and then cut vertically into four sections for ease of removal. Finally the moody cone was cut off completely at the bottom, draft tube floor level, and again cut into vertical quarter pieces for ease of removal. The moody cone in this case was 5 feet in diameter at the top, 34 feet at the bottom and 33 feet high. It was replaced by a 36 foot diameter dome, 2 feet deep of reinforced concrete.

Although moody cones are only cut and removed when necessary it was in this particular case.

Figure 2:
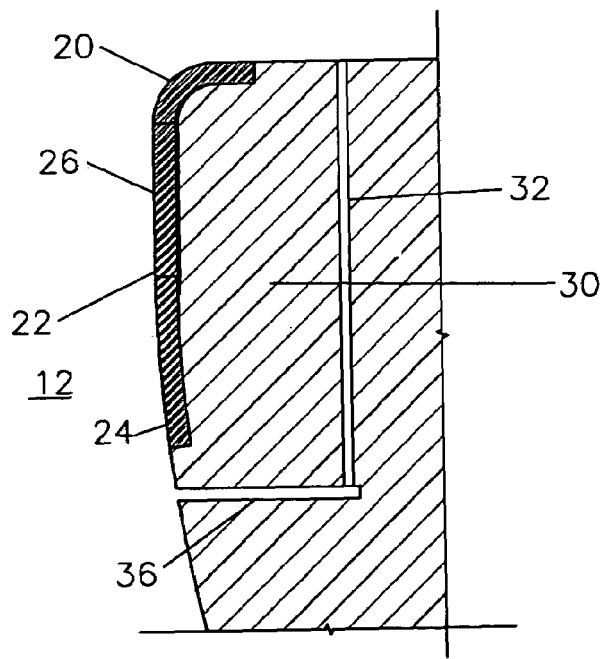
FIG. 2 shows a side sectional view of the cutting of an embedment section.
Figure 3:
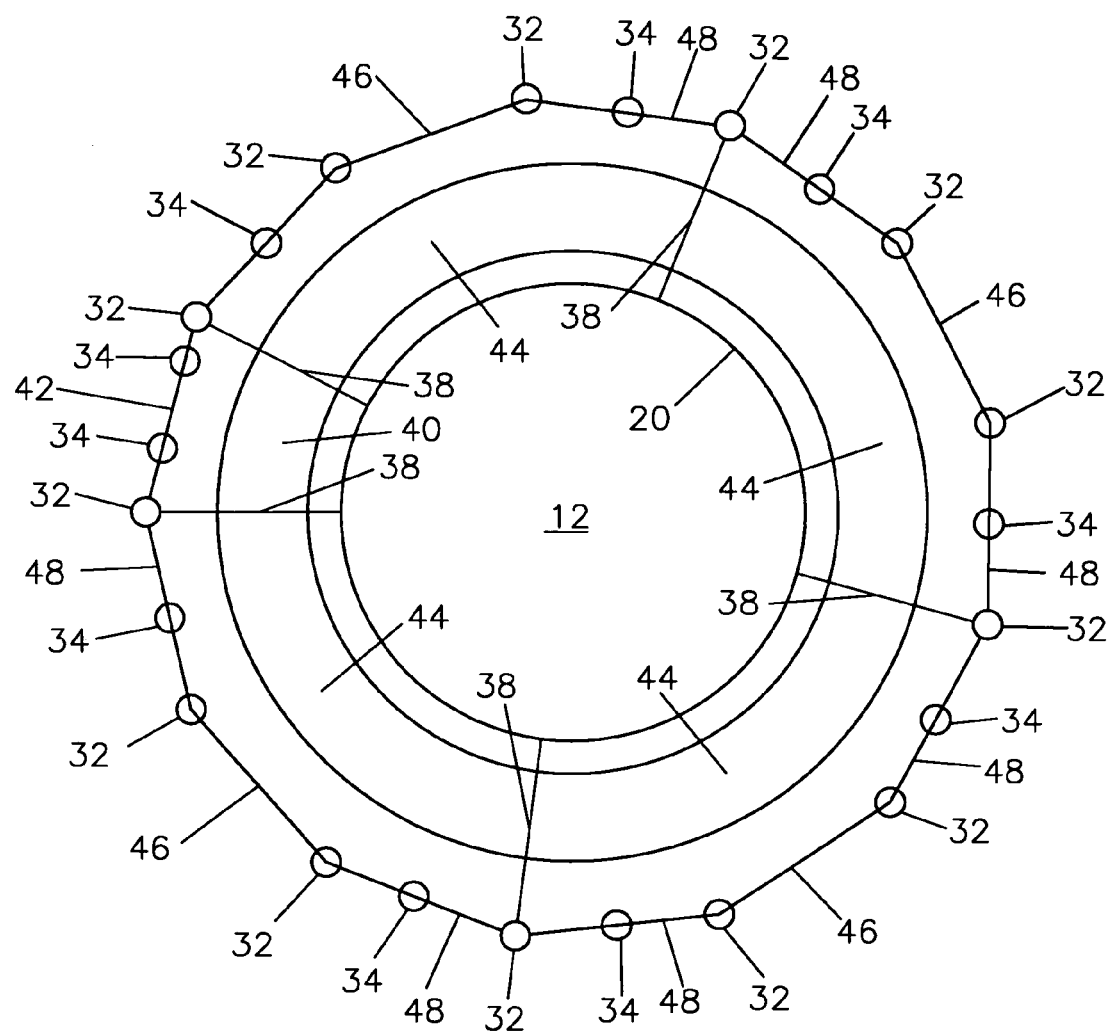
FIG. 3 shows a top plan view of the cutting of embedment sections.

FIGS. 2 and 3 shows how a section 30 of embedment 26 is removed. First thirteen shafts 32 were drilled 2" diameter and 12 feet deep strategically spaced around draft tube 12 sufficiently outside discharge ring 20 and draft tube liner 22, to clear all embedment elements, and sufficiently deep vertically to clear the bottom extent of embedment elements. In this case shafts 32 were spaced to form an approximately regular tridecagon centered on draft tube 12. Shafts 32 were drilled by Dimas six speed hydraulic core drills with extended core barrels. Shafts 32 are for wire saw access, and may be 3" diameter instead of 2". Additionally ten shafts 34 were drilled to the same depth, these as shown are two to one tridecagonal side, one to each of eight other sides and none to four, these shafts which may be 4½" or 5" in diameter, are for hoisting sling access, are drilled in the same way as shafts 32. Slot 36 was also cut, when moody cone 18 is present the top of the moody cone is removed for ease of access before cutting slot 36. A PT 60 Pentruder wall saw, made by Tractive, is set up just below the bottom ring. A special circular 16 foot diameter wall saw track, specially designed and made by Tractive, was used to cut a continuous ring around the inner circumference of the draft tube below the embedments. Three separate parallel cuts were made 6" on center and 18" deep. The concrete between the cuts was removed by small chipping hammers to form continuous circular slot 36 around the entire circumference of draft tube 12, which was then shored to support sections 30 during cutting. Shafts 32, and 34 and slot 36 are conveniently drilled and cut at the same time, although as those skilled in the art are aware drill and saw cannot occupy the same space at the same time. Slot 36 allowed access to the diamond cable used to cut embedment 26 into sections 30 vertically and back vertical cuts along the outer circumference of embedment sections 30. The diamond cable was PGM 100 diamond wire manufactured by Diamant Boart. The diamond wire was passed down shaft 32 out through slot 36 then brought up the face of tube 12 fed through a pulley system and back to a Dymosha 600 wire saw. Each radial cut 38 was approximately 11 feet deep and 2½ feet thick and took on average 3 hours. The wire proved effective in cutting through 1¾" thick steel plate liner and other structural steel elements of embedment 26, the wire remained open and cut freely during the entire cutting including structural steel and steel plate. Two cuts 38 were made from adjacent shafts 32 to form V section (a truncated triangle) 40, the outer steel casing of section 40 was welded using steel brackets to abutting steel casing of draft tube 12. The diamond wire was then fished through one shaft 32 and brought up the next one to cut back cut 42. Next hoisting slings were passed through shafts 34 brought up the embedment face of section 40, and secured, the steel brackets were removed and section 40 lifted freely. The residual embedment was cut into four individual sections 44, by radial cuts 38 made with PGM 100 diamond wire and Dymosha 600 wire saws. Each section 44 had three segmented back cuts, middle cut 46 was in each case the last back cut to be made. As there was much less steel reinforcement to cut in the back cuts a premium impregnated Diamond B wire was used, chosen for fast cutting in medium reinforced concrete. The outer cuts 48 were made fishing the wire down one shaft 32 and up the next shaft 32, first. The hoisting slings were then placed in position in shafts 34 in back cuts 48, and back cut 46 made from shaft 32 to adjacent shaft 32. Section 44 was then lifted freely. Sections 44 weighed about 17 tons each, section 40 about 6 tons. The entire project of embedment removal took 14 working days. A similar conventional project undertaken at the same time using jackhammers and the like took 44 days working 24 hours a day. Given that shut down hydroelectric generators represent considerable loss of power and profit, the saving in time and money is considerable.

Although in this case five sections were cut, one single segment, four three-segments, this is a matter of design convenience. The weight of each section, the available room, the available lifting power are all practical factors. To lessen section weight the outer polygonal circumference should be a close to the perimeter of the discharge ring as convenient, as should its length. The number of vertical back cuts also should be as few as possible. It is possible to conceive that an embedment should be cut into two portions each of say three segments ready for lifting, if both can be removed from the turbine site. In general the cut section is passed through the generator pit, which imposes a maximum size for removable sections.

As those skilled in the art would realize these preferred described details, methods, steps and apparati can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. Method of removing draft tube liner embedments from a draft tube, said draft tube comprising a draft ring, a draft tube liner and a bottom ring, comprising the step of drilling a vertical shaft near said draft tube, said shaft being outside the draft ring of said draft tube and extending below said embedments, said vertical shaft being a first vertical saw wire access shaft, and the step of cutting a continuous horizontal circular slot in the wall of said draft tube below the bottom ring of said draft tube and below said embedments for saw wire access, said circular slot and said vertical shaft intercepting each other.

2. The method of claim 1 additionally comprising the step of cutting a vertical radial cut from said vertical saw wire access shaft through said embedments to said draft tube using a saw wire.

3. The method of claim 2 comprising the step of placing a saw wire down said vertical saw wire access shaft out through said circular slot up the face of said draft tube, connecting said saw wire to a wire saw and cutting said vertical radial cut.

4. The method of claim 1 additionally comprising the step of drilling a second vertical shaft for saw wire access near said draft tube and near said first vertical saw wire access shaft, said second vertical shaft being outside the draft ring of said draft tube and extending below said embedments to said circular slot, said second vertical shaft being a second vertical saw wire access shaft.

5. The method of claim 4 additionally comprising the step of cutting a vertical back cut between said first and second vertical saw wire access shafts using a wire saw.

6. The method of claim 5 comprising the step of placing a saw wire down one said vertical saw wire access shaft across said circular slot and fishing said saw wire up said other saw wire access shaft, connecting said saw wire to a wire saw and cutting said vertical back cut.

7. The method of claim 1 comprising
the step of drilling several vertical shafts around said draft tube for saw wire access, said shafts forming a horizontal polygon outside the draft ring of said draft tube to encompass said embedments, and extending below said embedments to said circular slot, and the step of cutting selected vertical radial cuts from selected vertical saw wire access shafts through said embedments to said draft tube to divide said polygon into sections, and the step of cutting vertical back cuts from each vertical saw wire access shaft to the next vertical saw wire access shaft from each selected radial cut to the next selected radial cut, to cut said sections of said polygon free from its surroundings, and the step of removing said sections.

8. The method of claim 7 comprising
the step of placing a saw wire down each said selected vertical saw wire access shaft out through said circular slot up the face of said draft tube, connecting said saw wire to a wire saw and cutting each said vertical radial cut and the step of placing a saw wire down each said vertical saw wire access shaft across said circular slot, fishing said saw wire up said next saw wire access shaft, connecting said saw wire to a wire saw and cutting said vertical back cut.

9. Method of removing draft tube liner embedments from a draft tube, said draft tube comprising a draft ring, a draft tube liner and a bottom ring, comprising
the step of drilling vertical shafts around said draft tube, said shafts being saw wire access shafts forming a generally regular horizontal polygon outside the draft ring of said draft tube to encompass said embedments and the step of cutting a continuous horizontal circular slot in the wall of said draft tube below the bottom ring of said draft tube and below said embedments for saw wire access, said circular slot and said vertical shafts intercepting each other the step of drilling further vertical shafts around said draft tube for hoisting sling access, said further vertical shafts being hoisting sling access shafts located on faces of said polygon aligned with said saw wire access shafts, and extending below said embedments to said circular slot.

10. Method of claim 9 additionally comprising
the step of cutting vertical radial cuts from two adjacent vertical saw wire access shafts to said draft tube wall, using a saw wire, to form a partially cut truncated triangular piece of said polygon said piece having a single polygonal face with two hoist access shafts therein.

11. Method of claim 10 additionally comprising
the step of welding steel brackets to said draft tube wall to across said vertical radial cuts to fix said truncated triangular piece in place and the step of cutting a vertical back cut between said two adjacent saw wire access shafts.

12. The method of claim 11 additionally comprising
the step of passing hoist slings down said hoist access shafts, out said circular slot, up said draft tube and securing said slings to hoist means the step of cutting through said steel brackets and the step of hoisting said truncated triangular piece from sad draft tube.

13. The method of claim 12 wherein each said vertical radial cut is made by placing a saw wire down each said saw wire access shaft out through said circular slot, up said draft tube wall, connecting said saw wire to a wire saw and cutting said vertical radial cut and said vertical back cut is made by placing a saw wire down one said adjacent saw wire access shaft across said circular slot and fishing said saw wire up said other adjacent saw wire access shaft, connecting said saw wire to a wire saw and cutting said vertical back cut.

14. Method of claim 9 additionally comprising the step of cutting vertical radial cuts from two vertical saw wire access shafts to said draft tube wall, said vertical radial cuts being separated by three contiguous faces of said polygon, to form a partially cut piece of said polygon, said piece having three polygonal faces, with two outer faces adjacent said vertical radial cuts, each outer face having a hoist access shaft therein, and a middle face between said outer faces.

15. Method of claim 14 additionally comprising
the step of cutting two vertical back cuts along said outer faces between two adjacent saw wire access shafts.

16. Method of claim 15 additionally comprising
the step of passing hoist slings down each said hoist access shafts in said outer face back cut, out said circular slot, up said draft tube and securing said slings to hoist means.

17. Method of claim 16 additionally comprising
the step of cutting a vertical back cut along said middle face and the step of hoisting said piece from said draft tube.

18. Method of claim 17 wherein
each said vertical radial cut is made by placing a saw wire down each said saw wire access shaft out through said circular slot, up said draft tube wall, connecting said saw wire to a wire saw and cutting said vertical radial cut and each said vertical back cut is made by placing a saw wire down one said adjacent saw wire access shaft across said circular slot and fishing said saw wire up said other adjacent saw wire access shaft, connecting said saw wire to a wire saw and cutting said vertical back cut.

19. Method of claim 9 wherein said circular slot is made by
the step of cutting three parallel cuts and the step of chipping out said slot with small chipping hammers.

20. Method of claim 19 additionally comprising the step of shoring said slot.

* * * * *